(12) United States Patent
Perisic et al.

(10) Patent No.: US 8,587,962 B2
(45) Date of Patent: Nov. 19, 2013

(54) COMPENSATION FOR ELECTRICAL CONVERTER NONLINEARITIES

(75) Inventors: Milun Perisic, Torrance, CA (US); Ray M. Ransom, Big Bear City, CA (US); Lateef A. Kajouke, San Pedro, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 514 days.

(21) Appl. No.: 12/941,521

(22) Filed: Nov. 8, 2010

(65) Prior Publication Data

US 2012/0112549 A1     May 10, 2012

(51) Int. Cl.
*H02M 3/335*     (2006.01)
*H02M 7/217*     (2006.01)
*H02M 7/5387*     (2007.01)
*H02M 5/293*     (2006.01)

(52) U.S. Cl.
USPC .............. 363/17; 363/127; 363/132; 363/163

(58) Field of Classification Search
USPC ............... 363/8, 10, 78, 95, 97, 98, 131, 132, 363/157, 163, 164; 323/234, 237, 265, 266, 323/282, 285, 299, 300, 303
See application file for complete search history.

(56) References Cited

U.S. PATENT DOCUMENTS

| | | | |
|---|---|---|---|
| 4,213,173 A * | 7/1980 | Link et al. ..................... 363/163 |
| 4,669,036 A | 5/1987 | Cowett, Jr. | |
| 5,159,539 A | 10/1992 | Koyama | |
| 5,189,603 A | 2/1993 | Sashida et al. | |
| 5,274,538 A | 12/1993 | Sashida et al. | |
| 5,285,365 A | 2/1994 | Yamato et al. | |
| 5,461,297 A | 10/1995 | Crawford | |
| 5,545,971 A | 8/1996 | Gomez et al. | |
| 5,949,659 A | 9/1999 | Lesche | |
| 6,034,513 A | 3/2000 | Farrington et al. | |
| 6,147,886 A | 11/2000 | Wittenbreder | |

(Continued)

FOREIGN PATENT DOCUMENTS

| | | |
|---|---|---|
| DE | 102007040550 A1 | 3/2008 |
| GB | 2459542 A | 11/2009 |
| JP | 2008306855 A | 12/2008 |

OTHER PUBLICATIONS

USPTO, Office Action in U.S. Appl. No. 12/941,488, mailed Mar. 20, 2013.

(Continued)

*Primary Examiner* — Adolf Berhane
*Assistant Examiner* — Jeffrey Gblende
(74) *Attorney, Agent, or Firm* — Ingrassia Fisher & Lorenz, P.C.

(57) ABSTRACT

Systems and methods are provided for delivering energy from an input interface to an output interface. An electrical system includes an input interface, an output interface, an energy conversion module between the input interface and the output interface, an inductive element between the input interface and the energy conversion module, and a control module. The control module determines a compensated duty cycle control value for operating the energy conversion module to produce a desired voltage at the output interface and operates the energy conversion module to deliver energy to the output interface with a duty cycle that is influenced by the compensated duty cycle control value. The compensated duty cycle control value is influenced by the current through the inductive element and accounts for voltage across the switching elements of the energy conversion module.

19 Claims, 3 Drawing Sheets

(56) References Cited

U.S. PATENT DOCUMENTS

| | | |
|---|---|---|
| 6,351,397 B1 | 2/2002 | Sawa et al. |
| 6,496,343 B2 | 12/2002 | Mahlein et al. |
| 6,538,909 B2 | 3/2003 | Goodarzi et al. |
| 6,566,764 B2 | 5/2003 | Rebsdorf et al. |
| 6,583,519 B2 | 6/2003 | Aberle et al. |
| 6,614,132 B2 | 9/2003 | Hockney et al. |
| 6,989,613 B2 | 1/2006 | Andrews et al. |
| 6,998,732 B2 | 2/2006 | Xing et al. |
| 7,330,363 B2 | 2/2008 | Ponnaluri et al. |
| 7,483,282 B2 | 1/2009 | Kajouke et al. |
| 7,492,221 B2 | 2/2009 | Lawson et al. |
| 7,525,296 B2 | 4/2009 | Billig et al. |
| 7,558,087 B2 | 7/2009 | Meysenc et al. |
| 7,599,204 B2 | 10/2009 | Kajouke et al. |
| 7,679,941 B2 | 3/2010 | Raju et al. |
| 7,764,527 B2 | 7/2010 | Takayanagi |
| 8,063,606 B2 | 11/2011 | Veselic |
| 8,199,545 B2 | 6/2012 | Nguyen et al. |
| 8,288,887 B2 | 10/2012 | Ransom et al. |
| 2001/0012207 A1 | 8/2001 | Nomura |
| 2001/0026427 A1 | 10/2001 | Mahlein et al. |
| 2001/0036086 A1 | 11/2001 | Pascu et al. |
| 2002/0044468 A1* | 4/2002 | Goodarzi et al. ............... 363/98 |
| 2002/0176261 A1 | 11/2002 | Norrga |
| 2003/0102718 A1 | 6/2003 | Hockney et al. |
| 2004/0026929 A1 | 2/2004 | Rebsdorf et al. |
| 2004/0041543 A1 | 3/2004 | Brooks et al. |
| 2004/0066663 A1 | 4/2004 | Raichle |
| 2004/0119449 A1 | 6/2004 | Matley |
| 2004/0257271 A1 | 12/2004 | Jacobson et al. |
| 2005/0206343 A1 | 9/2005 | Ichinose et al. |
| 2006/0133120 A1* | 6/2006 | Sato et al. ............... 363/37 |
| 2007/0035265 A1 | 2/2007 | Balog, Jr. et al. |
| 2007/0139975 A1 | 6/2007 | Yamauchi et al. |
| 2007/0274109 A1 | 11/2007 | Oyobe et al. |
| 2008/0013351 A1 | 1/2008 | Alexander |
| 2008/0055938 A1 | 3/2008 | Kajouke et al. |
| 2008/0055954 A1* | 3/2008 | Kajouke et al. ............... 363/159 |
| 2008/0122422 A1* | 5/2008 | Zhang et al. ............... 323/351 |
| 2008/0130339 A1 | 6/2008 | McDonald et al. |
| 2009/0033393 A1 | 2/2009 | Park et al. |
| 2009/0059633 A1* | 3/2009 | Hara et al. ............... 363/126 |
| 2009/0251938 A1 | 10/2009 | Hallak |
| 2009/0322287 A1 | 12/2009 | Ozeki et al. |
| 2010/0103703 A1 | 4/2010 | Nishiyama et al. |
| 2010/0128503 A1* | 5/2010 | Liu et al. ............... 363/89 |
| 2010/0244773 A1 | 9/2010 | Kajouke |
| 2011/0031927 A1 | 2/2011 | Kajouke et al. |
| 2011/0031930 A1 | 2/2011 | Kajouke |
| 2011/0032732 A1 | 2/2011 | Hsu |
| 2011/0080151 A1 | 4/2011 | Rahardjo et al. |
| 2011/0089928 A1 | 4/2011 | O'Gorman et al. |
| 2011/0227407 A1 | 9/2011 | Ransom |
| 2012/0014140 A1 | 1/2012 | Kajouke et al. |
| 2012/0112549 A1 | 5/2012 | Perisic et al. |
| 2012/0113683 A1 | 5/2012 | Perisic et al. |
| 2012/0113700 A1 | 5/2012 | Kajouke et al. |

OTHER PUBLICATIONS

USPTO, Notice of Allowance and Fee(s) Due for U.S. Appl. No. 12/941,552, mailed Feb. 20, 2013.
USPTO, Notice of Allowance and Fee(s) Due for U.S. Appl. No. 12/535,994, mailed Sep. 7, 2012.
USPTO, Notice of Allowance and Fee(s) Due for U.S. Appl. No. 12/949,439, mailed Mar. 25, 2013.
Office Action, dated Oct. 24, 2012, for U.S. Appl. No. 12/941,552.
Office Action, dated Nov. 9, 2012, for U.S. Appl. No. 12/949,439.
Notice of Allowance, dated Nov. 15, 2012, for U.S. Appl. No. 12/725,265.
Notice of Allowance, dated Nov. 16, 2012, for U.S. Appl. No. 12/535,975.
USPTO "Notice of Allowance" mailed Jan. 25, 2013; U.S. Appl. No. 12/839,134, filed Jul. 19, 2010.
U.S. Office Action, dated Nov. 25, 2011, for U.S. Appl. No. 12/622,088.
U.S. Office Action, dated Jan. 23, 2012, for U.S. Appl. No. 12/535,994.
Kajouke, L.A., et al. "Discharging A DC Bus Capacitor of an Electrical Converter System," U.S. Appl. No. 13/090,911, filed Apr. 20, 2011.
Delorme, Gilles M., et al. "Methods and Systems for Controlling Vehicle Defrost Units," U.S. Appl. No. 12/871,664, filed Aug. 30, 2010.
U.S. Office Action, dated Feb. 8, 2012, for U.S. Appl. No. 12/535,975.
Perisic, M., et al. "Systems and Methods for Providing Power to a Load Based Upon a Control Strategy," U.S. Appl. No. 13/222,961, filed Aug. 31, 2011.
Perisic, M., et al. "Compensation for Electrical Converter Nonlinearities," U.S. Appl. No. 12/941,552, filed Nov. 8, 2010.
Perisic, M., et al. "Systems and Methods for Providing Power to a Load Based Upon a Control Strategy," U.S. Appl. No. 12/949,439, filed Nov. 18, 2010.
Ransom, Ray., et al. "Systems and Methods for Initializing a Charging System," U.S. Appl. No. 13/149,484, filed May 31, 2011.
Kajouke, L.A., et al. "Systems and Methods for Reducing Harmonic Distortion in Electrical Converters," U.S. Appl. No. 12/941,488, filed Nov. 8, 2010.
Chu, Grace, et al., "A Unified Approach for the Derivation of Robust Control for Boost PFC Converters," IEEE Transactions on Power Electronics, Nov. 2009, pp. 2531-2544, vol. 24, Issue: 11.
USPTO, U.S. "Final Office Action" mailed Jun. 28, 2012, for U.S. Appl. No. 12/535,994, filed Aug. 5, 2008.
USPTO, U.S. "Final Office Action" mailed May 10, 2012, for U.S. Appl. No. 12/413,181, filed Mar. 27, 2009.
USPTO, U.S. "Notice of Allowance" mailed Jun. 11, 2012, for U.S. Appl. No. 12/622,088, filed Nov. 19, 2009.
Office Action, dated Jul. 23, 2012, for U.S. Appl. No. 12/725,265.
Final Office Action, dated Aug. 2, 2012, for U.S. Appl. No. 12,535,975.
Office Action, dated Aug. 29, 2012, for U.S. Appl. No. 12/839,134.
Kajouke, L.A., "Systems and Methods for Bi-Directional Energy Delivery With Galvanic Isolation," U.S. Appl. No. 12/535,975, filed Aug. 5, 2009.
Kajouke, L.A., et al., "Charging System With Galvanic Isolation and Multiple Operating Modes," U.S. Appl. No. 12/535,994, filed Aug. 5, 2009.
Ransom, R.M., "Systems and Methods for Deactivating a Matrix Converter," U.S. Appl. No. 12/725,265, filed Mar. 16, 2010.
Kajouke, L.A., et al., "Systems and Methods for Reducing Transient Voltage Spikes in Matrix Converters," U.S. Appl. No. 12/839,134, filed Jul. 19, 2010.
Ransom R.M., et al. "Systems and Methods for Commutating Inductor Current Using a Matrix Converter," U.S. Appl. No. 12/622,088, filed Nov. 19, 2009.
Figueres, E., et al. "A Control Circuit With Load-Current Injection for Single-Phase Power-Factor-Correction Rectifiers," IEEE Transactions on Industrial Electronics, Jun. 2007, pp. 1272-1281, vol. 54, No. 3.
Prathapan, P.T., et al., "Feedforward Current Control of Boost-Derived Single-phase PFC Converters," IEEE Applied Power Electronics Conference and Exposition, Mar. 2005, pp. 1716-1722, vol. 3.
Office Action, dated Oct. 5, 2011, for U.S. Appl. No. 12/413,181.
USPTO, Office Action for U.S. Appl. No. 12/413,181, mailed Aug. 15, 2013.
USPTO, Notice of Allowance and Fee(s) Due for U.S. Appl. No. 12/941,488, mailed Jul. 31, 2013.
USPTO, Notice of Allowance and Fee(s) Due for U.S. Appl. No. 13/222,961, mailed Sep. 18, 2013.
USPTO, Notice of Allowance and Fee(s) Due for U.S. Appl. No. 13/149,484, mailed Jun. 26, 2013.

* cited by examiner

US 8,587,962 B2

COMPENSATION FOR ELECTRICAL CONVERTER NONLINEARITIES

STATEMENT REGARDING FEDERALLY SPONSORED RESEARCH OR DEVELOPMENT

This invention was made with Government support under Agreement No. DE-FC26-07NT43123, awarded by the United States Department of Energy. The Government has certain rights in this invention.

TECHNICAL FIELD

Embodiments of the subject matter described herein relate generally to electrical systems in automotive vehicles, and more particularly, embodiments of the subject matter relate to bidirectional energy delivery systems with galvanic isolation.

BACKGROUND

Matrix converters may be used in electric and/or hybrid vehicles to accommodate delivery of relatively high power over a relatively wide range of operating voltages, while at the same time achieving galvanic isolation, relatively high power factors, low harmonic distortion, relatively high power density and low cost. For example, bidirectional isolated matrix converters may be used to deliver energy from an alternating current (AC) energy source, such as the single-phase grid electricity common in most residential and commercial buildings, to charge a direct current (DC) energy storage element, such as a rechargeable battery, in a vehicle. However, nonlinear power losses attributable to components of the matrix converter, such as transistor switches or diodes, may limit the accuracy and effectiveness of existing control strategies.

BRIEF SUMMARY

In accordance with one embodiment, an electrical system is provided. The electrical system includes an input interface, an output interface, an energy conversion module coupled between the input interface and the output interface, an inductive element coupled electrically in series between the Input interface and the energy conversion module, and a control module coupled to the energy conversion module and the inductive element. The energy conversion module includes one or more switching elements. The control module is configured to determine a compensated duty cycle control value for operating the energy conversion module to produce a desired voltage at the output interface and operate the switching elements of the energy conversion module to deliver energy to the output interface with a duty cycle that is influenced by the compensated duty cycle control value. The compensated duty cycle control value is influenced by a current through the inductive element and accounts for voltage across the one or more switching elements while operating the energy conversion module.

In accordance with another embodiment, a method is provided for using an energy conversion module to deliver energy from an input interface to an output interface. The energy conversion module is coupled between the input interface and the output interface and includes a plurality of switching elements coupled to an inductive element. The method comprises the steps of obtaining a measured voltage at the output interface, obtaining a current through the inductive element, determining an estimated voltage loss for the energy conversion module based on the current through the inductive element, and adding the measured voltage and the estimated voltage loss to obtain a compensated output voltage. The method continues by determining an input voltage reference for producing a desired output voltage at the output interface, determining a compensated duty cycle control value in a manner that is influenced by the input voltage reference and the compensated output voltage, and operating the plurality of switching elements to deliver energy from the input interface to the output interface with a duty cycle that is influenced by the compensated duty cycle control value.

In another embodiment, an electrical system is provided. The electrical system comprises a DC interface, an alternating current (AC) interface, an isolation module including a first set of windings magnetically coupled to a second set of windings, a first energy conversion module coupled between the DC interface and the first set of windings, a second energy conversion module coupled to the second set of windings, an inductive element coupled between the second energy conversion module and the AC interface, and a control module coupled to the DC interface, the AC interface, the inductive element, and the second energy conversion module. The second energy conversion module includes a plurality of switches. The control module is configured to determine an input voltage reference for producing a desired voltage at the DC interface based on a measured voltage at the DC interface, a measured current through the inductive element, and a measured voltage at the AC interface. The control module also determines an estimated cumulative voltage loss for the second energy conversion module based on the measured current through the inductive element and adds the measured voltage at the DC interface and the estimated cumulative voltage loss to obtain a compensated output voltage. The control module determines a compensated pulse-width modulation (PWM) duty cycle control value for operating the first energy conversion module based on the input voltage reference and the compensated output voltage, and operates the plurality of switches of the second energy conversion module in accordance with the compensated PWM duty cycle control value.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Technologies and concepts discussed herein relate generally to electrical converters capable of delivering energy from an alternating current (AC) interface to a direct current (DC) interface. As described in greater detail below, a feedforward control scheme is used to determine an input voltage reference for the input voltage at the AC interface based on a desired output voltage at the DC interface and a measured voltage at the DC interface, and a pulse-width modulation (PWM) duty cycle control value for operating the electrical converter is determined based on a ratio of the input voltage reference to the measured voltage at the DC interface. In an exemplary embodiment, the input voltage reference and the measured voltage are adjusted to compensate for voltages across (or voltage losses attributable to) components (e.g., switches and/or diodes) of the electrical converters in a manner that decreases the PWM duty cycle control value (and thereby increase the energy delivery duty cycle) in a manner that accounts for component power losses.

Figure 1:
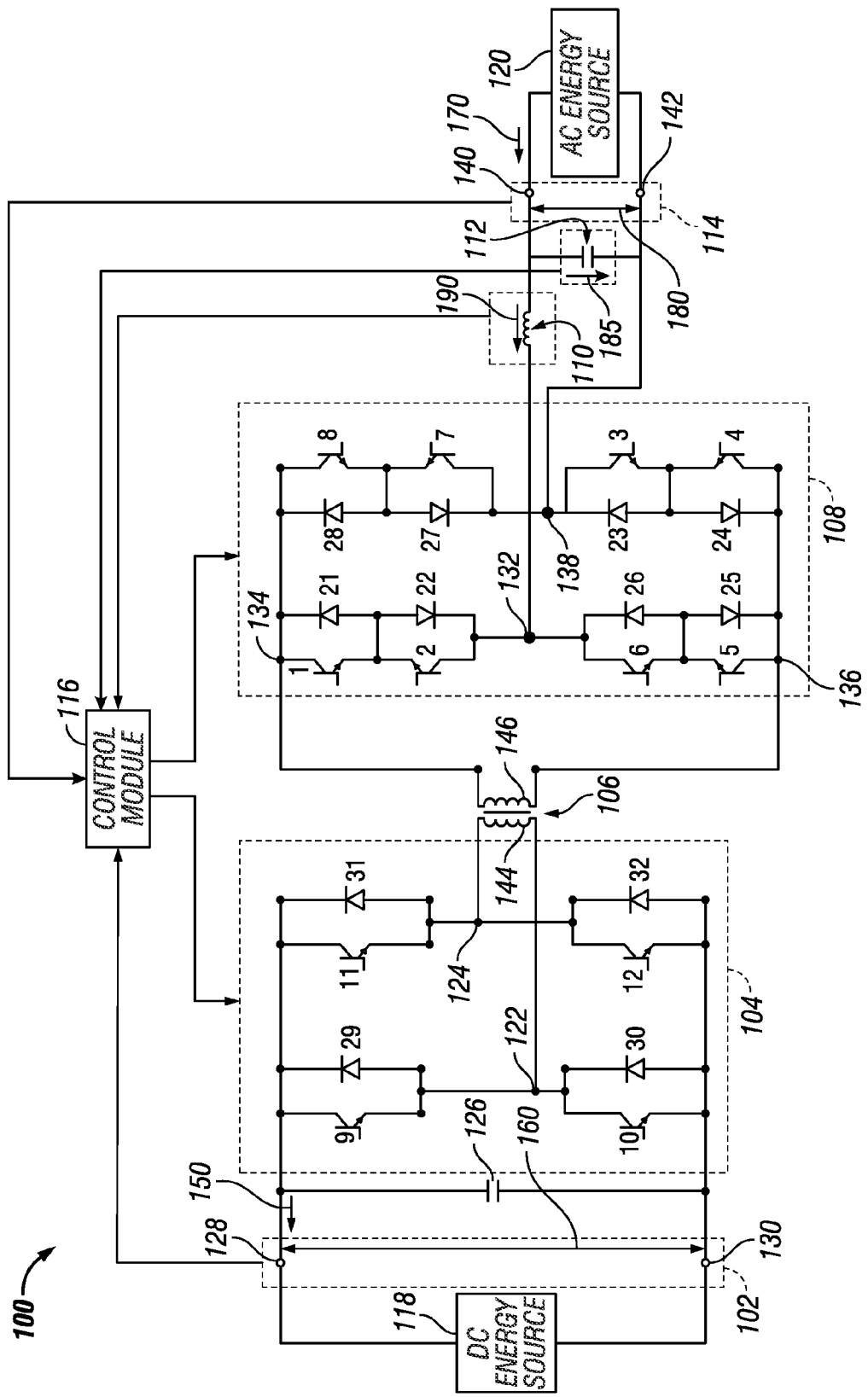
FIG. 1 is a schematic view of a electrical system suitable for use in a vehicle in accordance with one embodiment.

FIG. 1 depicts an exemplary embodiment of an electrical system 100 (or alternatively, a charging system, charger or charging module) suitable for use in a vehicle, such as, for example, an electric and/or hybrid vehicle. The electrical system 100 includes, without limitation, a first interface 102, a first energy conversion module 104, an isolation module 106, a second energy conversion module 108, an inductive element 110, a capacitive element 112, a second interface 114, and a control module 116. The first interface 102 generally represents the physical interface (e.g., terminals, connectors, and the like) for coupling the electrical system 100 to a DC energy source 118 and the second interface 114 generally represents the physical interface (e.g., terminals, connectors, and the like) for coupling the electrical system 100 to an AC energy source 120. Accordingly, for convenience, the first interface 102 may be referred to herein as the DC interface and the second interface 114 may be referred to herein as the AC interface. In an exemplary embodiment, the control module 116 is coupled to the energy conversion modules 104, 108 and operates the energy conversion modules 104, 108 to deliver energy (or power) from the AC energy source 120 to the DC energy source 118 to achieve a desired DC output voltage ($V_{REF}$) at the DC interface 102, as described in greater detail below.

In an exemplary embodiment, the DC energy source 118 (or alternatively, the energy storage source or ESS) is capable of receiving a direct current (indicated by arrow 150) from the electrical system 100 at a particular DC voltage level (indicated by arrow 160). In accordance with one embodiment, the DC energy source 118 is realized as a rechargeable high-voltage battery pack having a nominal DC voltage range from about 200 to about 500 Volts DC. In this regard, the DC energy source 118 may comprise the primary energy source for another electrical system and/or an electric motor in a vehicle. For example, the DC energy source 118 may be coupled to a power inverter that is configured to provide voltage and/or current to the electric motor, which, in turn, may engage a transmission to drive the vehicle in a conventional manner. In other embodiments, the DC energy source 118 may be realized as a battery, an ultracapacitor, or another suitable energy storage element.

The AC energy source 120 (or power source) is configured to provide an AC current (indicated by arrow 170) to the electrical system 100 at a particular AC voltage level (indicated by arrow 180) and may be realized as a main power supply or main electrical system for a building, residence, or another structure within an electric power grid (e.g., mains electricity or grid power). In accordance with one embodiment, the AC energy source 120 comprises a single-phase power supply, as is common to most residential structures, which varies depending on the geographic region. For example, in the United States, the AC energy source 120 may be realized as 120 Volts (RMS) or 240 Volts (RMS) at 60 Hz, while in other regions the AC energy source 120 may be realized as 110 Volts (RMS) or 220 Volts (RMS) at 50 Hz. In alternative embodiments, the AC energy source 120 may be realized as any AC energy source suitable for operation with the electrical system 100.

As described in greater detail below, the DC interface 102 is coupled to the first energy conversion module 104, and the AC interface 114 is coupled to the second energy conversion module 108 via the inductive element 110. The isolation module 106 is coupled between the energy conversion modules 104, 108 and provides galvanic isolation between the two energy conversion modules 104, 108. The control module 116 is coupled to the energy conversion modules 104, 108 and operates the second energy conversion module 108 to convert energy from the AC energy source 120 to high-frequency energy across the isolation module 106, which is then converted to DC energy at the DC interface 102 by the energy conversion module 104. It should be understood that although the subject matter may be described herein in the context of a grid-to-vehicle application (e.g., the AC energy source 120 delivering energy to the DC energy source 118) for purposes of explanation, in other embodiments, the subject matter described herein may be implemented and/or utilized in vehicle-to-grid applications (e.g., the DC energy source 118 delivering energy to the AC interface 114 and/or AC energy source 120). For convenience, but without limitation, the AC interface 114 may alternatively be referred to herein as the input interface, and the DC interface 102 may alternatively be referred to herein as the output interface in the context of a grid-to-vehicle application.

In order to deliver energy to (or charge) the DC energy source 118, the first energy conversion module 104 converts the high-frequency energy at nodes 122, 124 to DC energy that is provided to the DC energy source 118 at the DC interface 102. In this regard, the first energy conversion module 104 operates as a rectifier when converting high frequency AC energy to DC energy. In the illustrated embodiment, the first energy conversion module 104 comprises four switching elements (9-12) with each switching element having a diode (29-32) configured antiparallel to the respective switching element to accommodate bidirectional energy delivery. As shown, a capacitor 126 is configured electrically in parallel across the DC interface 102 to reduce voltage ripple at the DC interface 102, as will be appreciated in the art.

In an exemplary embodiment, the switching elements 9-12 are transistors, and may be realized using any suitable semiconductor transistor switch, such as a insulated gate bipolar transistor (IGBT), a field-effect transistor (e.g., a MOSFET or the like), or any other comparable device known in the art. The switches and diodes are antiparallel, meaning the switch and diode are electrically in parallel with reversed or inverse polarity. The antiparallel configuration allows for bidirectional current flow while blocking voltage unidirectionally, as will be appreciated in the art. In this configuration, the direction of current through the switches is opposite to the direction of allowable current through the respective diodes. The antiparallel diodes are connected across each switch to provide a path for current to the DC energy source 118 for charging the DC energy source 118 when the respective switch is off.

In the illustrated embodiment, switch 9 is connected between node 128 of the DC interface 102 and node 122 and configured to provide a path for current flow from node 128 to node 122 when switch 9 is closed. Diode 29 is connected between node 122 and node 128 and configured to provide a path for current flow from node 122 to node 128 (e.g., diode 29 is antiparallel to switch 9). Switch 10 is connected between node 130 of the DC interface 102 and node 122 and configured to provide a path for current flow from node 122 to node 130 when switch 10 is closed, while diode 30 is connected between node 122 and node 130 and configured to provide a path for current flow from node 130 to node 122. In a similar manner, switch 11 is connected between node 128 and node 124 and configured to provide a path for current flow from node 128 to node 124 when switch 11 is closed, diode 31 is connected between node 124 and the DC interface 102 and configured to provide a path for current flow from node 124 to node 128, switch 12 is connected between node 130 and node 124 and configured to provide a path for current flow from node 124 to node 130 when switch 12 is closed, and diode 32 is connected between node 124 and the DC interface 102 and configured to provide a path for current flow from the node 130 to node 124.

In an exemplary embodiment, the second energy conversion module 108 facilitates the flow of current (or energy) from the AC energy source 120 and/or inductive element 110 to the isolation module 106. In the illustrated embodiment, the second energy conversion module 108 is realized as a front end single-phase matrix conversion module comprising eight switching elements 1-8 with each switching element having a diode 21-28 configured antiparallel to the respective switching element, in a similar manner as set forth above in regards to the first energy conversion module 104. For convenience, but without limitation, the second energy conversion module 108 may alternatively be referred to herein as a matrix conversion module. As described in greater detail below, the control module 116 modulates (e.g., opens and/or closes) the switches 1-8 of the matrix conversion module 108 in accordance with a PWM duty cycle control value to produce a high-frequency voltage at nodes 134, 136 that results in a power flow to the DC interface 102 and/or DC energy source 118 intended to achieve a desired output voltage at the DC interface 102.

In the illustrated embodiment of FIG. 1, a first pair of switches 1, 2 and diodes 21, 22 are coupled between node 132 and node 134, with the first pair of switch and antiparallel diode (e.g., switch 1 and diode 21) being configured with opposite polarity to the second pair of switch and antiparallel diode (e.g., switch 2 and diode 22). In this manner, switch 1 and diode 22 are configured to provide a path for current flow from node 134 through switch 1 and diode 22 to node 132 when switch 1 is closed, turned on, or otherwise activated and the voltage at node 134 is more positive than the voltage at node 132. Switch 2 and diode 21 are configured to provide a path for current flow from node 132 through switch 2 and diode 21 to node 134 when switch 2 is closed, turned on, or otherwise activated and the voltage at node 132 is more positive than the voltage at node 134. In a similar manner, a second pair of switches 3, 4 and diodes 23, 24 are coupled between node 136 and node 138, a third pair of switches 5, 6 and diodes 25, 26 are coupled between node 132 and node 136, and a fourth pair of switches 7, 8 and diodes 27, 28 are coupled between node 134 and node 138.

In the illustrated embodiment, switches 1, 3, 5, and 7 comprise a first set of switches which are capable of commutating the current through the inductive element 110 ($i_L$) (indicated by arrow 190) from node 138 to node 132 when the current through the inductive element 110 is flowing in a negative direction (e.g., $i_L<0$), and switches 2, 4, 6, and 8 comprise a second set of switches that are capable of commutating the current through the inductive element 110 from node 132 to node 138 when the current through the inductive element 110 is flowing in a positive direction (e.g., $i_L>0$), as described in greater detail below. In other words, switches 1, 3, 5, 7 are capable of conducting at least a portion of current flowing in a negative direction through the inductive element 110 (e.g., $i_L<0$) and switches 2, 4, 6, 8 are capable of conducting at least a portion of current flowing in a positive direction through the inductive element 110 (e.g., $i_L>0$). As used herein, commutating should be understood as the process of cycling the current through the inductive element 110 through switches and diodes of the matrix conversion module 108 such that the flow of current through the inductive element 110 is not interrupted.

In an exemplary embodiment, the isolation module 106 comprises a first set of windings 144 connected between nodes 122, 124 of the first energy conversion module 104 and a second set of windings 146 connected between nodes 134, 136. For purposes of explanation, the windings 146 may be referred to herein as comprising the primary winding stage (or primary windings), and the sets of windings 144 may be referred to herein as comprising the secondary winding stage (or secondary windings). The windings 144, 146 provide inductive elements that are magnetically coupled in a conventional manner to form a transformer, as will be appreciated in the art. In an exemplary embodiment, the isolation module 106 is realized as a high-frequency transformer. In this regard, the isolation module 106 comprises a transformer designed for a particular power level at a high-frequency, such as the switching frequency of the switches of the energy conversion modules 104, 108 (e.g., 50 kHz), resulting in the physical size of the transformer being reduced relative to a transformer designed for the same power level at a lower frequency, such as the frequency of the AC energy source 120 (e.g., the mains frequency).

In an exemplary embodiment, the inductive element 110 is realized as an inductor configured electrically in series between node 132 of the matrix conversion module 108 and a node 140 of the AC interface 114. Accordingly, for convenience, but without limitation, the inductive element 110 is referred to herein as an inductor. The inductor 110 functions as a high-frequency inductive energy storage element during operation of the electrical system 100. The capacitive element 112 is realized as a capacitor coupled between node 140 and node 142 of the AC interface 114, that is, the capacitor 112 is configured electrically parallel to the AC interface 114. The capacitor 112 and inductor 110 are cooperatively configured to provide a high frequency filter to minimize voltage ripple at the AC interface 114 attributable to modulating switches 1-8.

The control module 116 generally represents the hardware, firmware and/or software configured to operate and/or modulate the switches of the energy conversion modules 104, 108 to achieve a desired power flow from the AC energy source 120 to the DC energy source 118. Depending on the embodiment, the control module 116 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein.

During normal operation for grid-to-vehicle applications, the control module 116 determines PWM command signals that control the timing and duty cycles of the switches 1-8 of the matrix conversion module 108 to produce a high-frequency AC voltage across the primary windings 146 of the isolation module 106. The high-frequency AC voltage across the primary windings 146 induces a voltage across the secondary windings 144 at nodes 122, 124 that results in a desired current flowing to the DC interface 102 to charge or otherwise deliver energy to the DC energy source 118. As described in greater detail below, the control module 116 generates a PWM duty cycle control value that controls the duty cycle of the switches 1-8 to implement the appropriate switching pattern during a switching interval (e.g., the inverse of the switching frequency). During the switching interval (or PWM cycle), the control module 116 alternates between operating the switches 1-8 to effectively short-circuit nodes 132, 138 and cycle energy through the matrix conversion module 108 to apply a voltage across the inductor 110 before operating the switches 1-8 to release the stored energy and/or voltage of the inductor 110 (alternatively, the fly-back voltage). The sum of the fly-back voltage and the input voltage 180 at the AC interface 114 is applied to the primary windings 146 of the isolation module 106, resulting in a power transfer to nodes 122, 124 and/or DC energy source 118. In this manner, the control module 116 operates the switches 1-8 of the matrix conversion module 108 to alternate between cycling energy through the inductor 110 and delivering energy to the DC interface 102. As described in greater detail below, the percentage of the switching interval (or PWM cycle) that the matrix conversion module 108 is delivering energy to the DC interface 102 corresponds to the duty cycle of the matrix conversion module 108 during that respective switching interval.

In an exemplary embodiment, the control module 116 obtains or otherwise monitors the current 190 through the inductor 110 (e.g., a measured inductor current ($i_L$) via a current sensor electrically in series with the inductor 110), the current (indicated by arrow 185) through the capacitor 112 (e.g., a measured capacitor current ($i_{CAP}$) via a current sensor electrically in series with the capacitor 112), the input voltage 180 at the AC interface 114, and the output voltage 160 at the DC interface 102, and implements a feedforward control system to determine a PWM duty cycle control value for operating the switches 1-8 of the matrix conversion module 108, as described in greater detail below. In an exemplary embodiment, the control module 116 obtains measured instantaneous values for the inductor current ($i_L$), the capacitor current ($i_{CAP}$), the input voltage ($V_{AC}$) at the input interface 114, and the output voltage ($V_{DC}$) at the output interface 102 that are sampled, measured, or otherwise obtained at a particular instant in time during a current PWM cycle, wherein the PWM duty cycle control value determined by the control module 116 governs operation of the electrical converter during the subsequent PWM cycle. As described in greater detail below, in an exemplary embodiment, the feedforward control system implemented by the control module 116 generates a compensated PWM duty cycle control value that is scaled in a manner that accounts for voltage losses and/or energy losses across the switches 1-8 and diodes 21-32 of the electrical system 100 when alternating between delivering energy and cycling energy through the inductor 110.

It should be understood that FIG. 1 is a simplified representation of an electrical system 100 for purposes of explanation and is not intended to limit the scope or applicability of the subject matter described herein in any way. Thus, although FIG. 1 depicts direct electrical connections between circuit elements and/or terminals, alternative embodiments may employ intervening circuit elements and/or components while functioning in a substantially similar manner. Additionally, although the electrical system 100 is described herein in the context of a matrix conversion module 108 for a vehicle, the subject matter is not intended to be limited to vehicular and/or automotive applications, and the subject matter described herein may be implemented in other applications where an energy conversion module is utilized to transfer energy using switching elements or in other electrical systems where feedforward control schemes are utilized to achieve power factor correction by modeling the input interface as a loss-free resistor.

Figure 2:
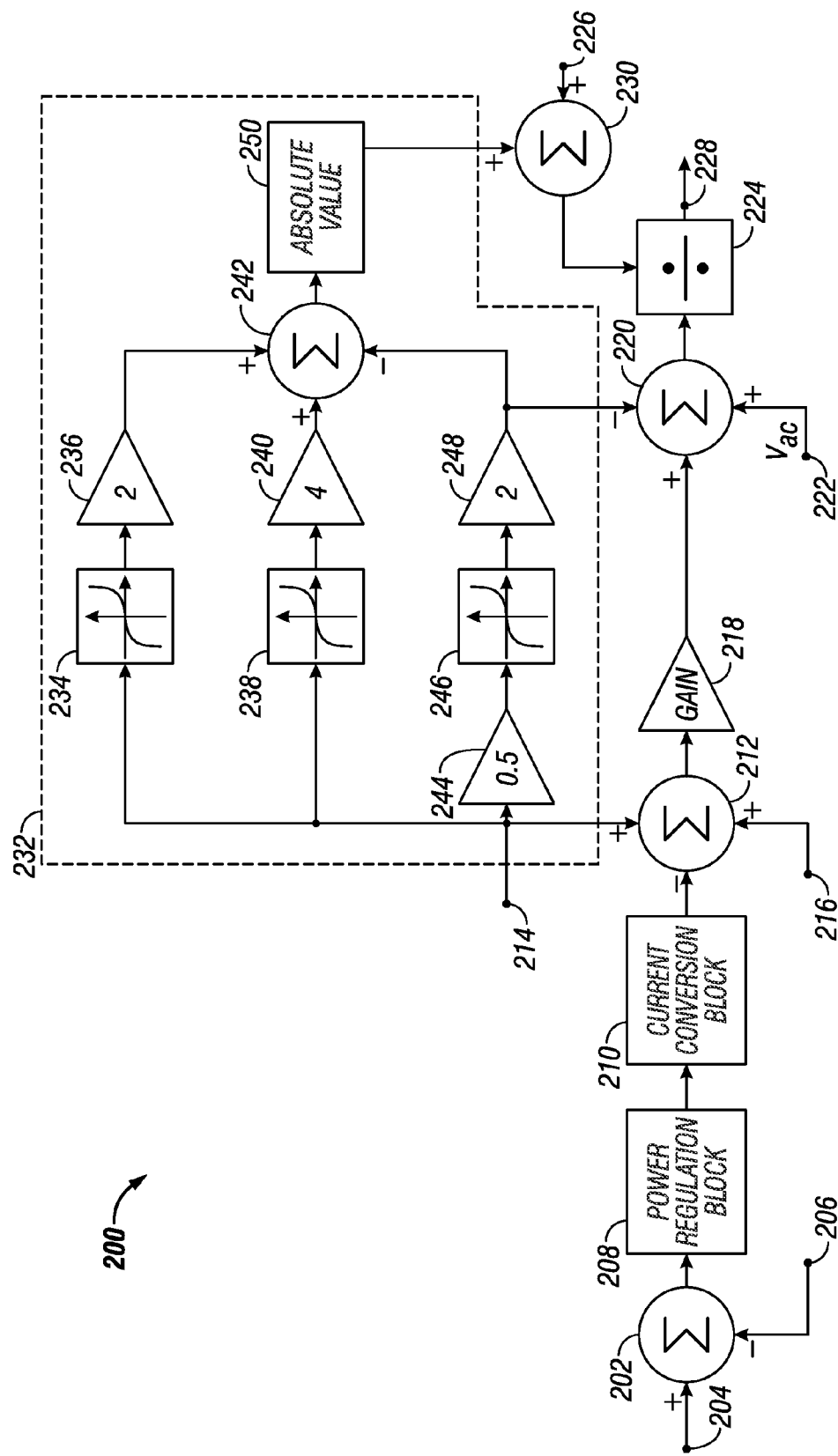
FIG. 2 is a block diagram of a control system suitable for use with the electrical system of FIG. 1 in accordance with one embodiment.

FIG. 2 depicts an exemplary embodiment of a feedforward control system 200 suitable for use by the control module 116 of FIG. 1. The control system 200 is configured to calculate or otherwise determine a compensated PWM duty cycle control value ($U_C$) for operating the matrix conversion module 108 to provide a desired DC output voltage ($V_{REF}$) at the DC interface 102. In this regard, the compensated PWM duty cycle control value ($U_C$) governs the duty cycle (d) for operating matrix conversion module 108 during a subsequent PWM cycle (or switching interval), which in turn, governs the respective timing and duty cycles of the switches 1-8 of the matrix conversion module 108 for implementing a desired switching pattern. The compensated PWM duty cycle control value is a value between zero and one that is equal to one minus the duty cycle ($U_C=1-d$), or alternatively, the duty cycle is equal to one minus the compensated PWM duty cycle control value ($d=1-U_C$). In this manner, the duty cycle is influenced by the compensated PWM duty cycle control value.

In an exemplary embodiment, the feedforward control system 200 includes a first summation block 202 configured to generate an output energy error value based on a difference between a desired energy output at a first input 204 and a measured energy output at a second input 206. In an exemplary embodiment, the desired energy output at the DC interface 102 is calculated or otherwise determined based on the desired DC output voltage ($V_{REF}$), for example, by squaring the desired DC output voltage ($V_{REF}^2$), and the measured energy output at the DC interface 102 is calculated or otherwise determined based on the measured instantaneous output voltage ($V_{DC}$), for example, by squaring the measured instantaneous output voltage ($V_{DC}^2$). The output energy error value is provided to the input of a power regulation block 208. The power regulation block 208 generates a desired AC input power reference value for producing the desired DC output power at the DC interface 102 based on the output energy error value.

In the illustrated embodiment, the desired AC input power reference value is provided to a current conversion block 210 that converts the desired AC input power reference value to an AC input current reference value representative of the required AC current at the AC interface 114 for producing the desired AC input power. The AC input current reference value corresponds to an AC input current at the AC interface 114 that is substantially in-phase with the AC input voltage 180 at the AC interface 114 to provide substantially unity power factor while producing the desired AC input power. In an exemplary embodiment, the current conversion block 210 generates or otherwise determines the AC input current reference value by multiplying the AC input power reference value by the measured AC voltage 180 at the AC interface 114 divided by the square of the root-mean-square (RMS) voltage at the AC interface 114.

In the illustrated embodiment, a second summation block 212 is configured to generate or otherwise provide an inductor current error value based on the difference between the measured inductor current ($i_L$) and an inductor current reference value. In an exemplary embodiment, the second summation block 212 estimates or otherwise determines the inductor current reference value as the difference between the AC input current reference value and the measured capacitor current ($i_{CAP}$) received at input 216. The second summation block 212 subtracts the inductor current reference value from the measured inductor current ($i_L$) received at input 214 to generate or otherwise obtain the inductor current error value, and provides the inductor current error value to a gain block 218 which multiplies the inductor current error value by a gain factor to translate or otherwise convert the inductor current error value to an AC input voltage error value. A third summation block 220 is configured to generate an AC input voltage reference value by adding the AC input voltage error value to the measured AC voltage ($V_{AC}$) at the AC interface 114, which is provided at input 222. As described in greater detail below, an estimated cycling voltage is subtracted from the AC input voltage reference value to adjust the AC input voltage reference value in a manner that compensates for power losses and/or voltages across switches 1-8 and diodes 21-28 of the matrix conversion module 108 when cycling energy through the inductor 110.

In the illustrated embodiment, the control system 200 includes a division block 224 configured to divide the compensated AC input voltage reference value from the output of the third summation block 220 by a compensated DC output voltage reference value from the output of a fourth summation block 230 to obtain the compensated PWM duty cycle control value ($U_C$) at output 228. As described in greater detail below, the compensated DC output voltage reference value corresponds to the sum of the measured instantaneous output voltage ($V_{DC}$) provided to the fourth summation block 230 at input 226 and the estimated voltage across switches 1-8 and diodes 21-32 of the energy conversion modules 104, 108 during the current PWM cycle. In this manner, the compensated DC output voltage reference value corresponds to the effective DC voltage difference at the input of the matrix conversion module 108, that is, the effective DC voltage difference between nodes 132, 138, during the current PWM cycle. In other words, the compensated DC output voltage reference value corresponds to the effective DC output voltage seen by the inductor 110 between nodes 132, 138 that accounts for the voltages across components of the energy conversion modules 104, 108.

In an exemplary embodiment, the measured instantaneous output voltage ($V_{DC}$) at input 226 represents an instantaneous value of the output voltage 160 at the DC interface 102, such as, for example, the most recently sampled output voltage 160 that was measured or otherwise obtained during the current PWM cycle (or current switching interval). In this regard, the output voltage 160 at the DC interface 102 includes both a DC voltage component and an AC voltage component at the second harmonic of the AC input frequency, for example, a DC voltage with a superimposed 120 Hz AC voltage for a 60 Hz AC energy source 120 coupled to AC interface 114. Thus, using a measured instantaneous DC output voltage ($V_{DC}$) to determine the output energy error value (e.g., by providing the square of the measured DC output voltage at input 206) introduces harmonic component that is reflected by the AC input voltage error value, which results in the AC input voltage reference value at the output of the third summation block 220 including a harmonic component. Dividing the AC input voltage reference value by the adjusted DC output voltage value that includes the measured instantaneous DC output voltage ($V_{DC}$) effectively cancels or otherwise eliminates the effect of the harmonic component on the PWM duty cycle control value ($U_C$). As a result, the total harmonic distortion at the AC interface 114 is reduced.

In an exemplary embodiment, the control system 200 includes a voltage estimation block 232 configured to calculate, determine or otherwise estimate, based on the measured inductor current ($i_L$) at input 214, the estimated voltage loss for the energy conversion modules 104, 108 during the current PWM cycle that is provided to the fourth summation block 230 and the estimated cycling voltage across conducting switches 1-8 and diodes 21-28 of the matrix conversion module 108 when cycling energy through the inductor 110 that is provided to the third summation block 220. In the illustrated embodiment, the voltage estimation block 232 includes a switch voltage estimation block 234 configured to calculate or otherwise determine an estimated switch voltage across an individual switch 1-8 of the matrix conversion module 108 when that individual switch 1-8 conducts the inductor current ($i_L$). In this regard, the estimated switch voltage corresponds to the voltage across a conducting switch of the matrix conversion module when the switches 1-8 are operated to deliver energy to the DC interface 102, as described in greater detail below. In accordance with one embodiment, the estimated switch voltage is determined by multiplying the nominal ON-resistance of the switches 1-8 by the inductor current ($i_L$). In other embodiments, a function governing the voltage across a conducting switch as a function of the current flowing through (or being conducted by) the switch may be empirically determined and utilized to estimate the switch voltage for the measured inductor current ($i_L$). In practice, the nominal ON-resistance of the switches or a function to determine voltage across a conducting switch as a function of the conducted current may also be obtained from data sheets provided by the manufacturer of the switches. A gain block 236 multiplies the estimated switch voltage by two to obtain a total estimated switch voltage drop when delivering energy to the DC interface 102 during the current PWM cycle, because two switches of the matrix conversion module 108 conduct the inductor current ($i_L$) when delivering energy to the DC interface 102 during a PWM cycle, as described above and in greater detail below. In this manner, the total estimated switch voltage drop represents the portion of the voltage difference between node 132 and node 138 that is attributable to the switches 1-8 of the matrix conversion module 108 when delivering energy to the DC interface 102.

In an exemplary embodiment, the voltage estimation block 232 also includes a diode voltage estimation block 238 configured to calculate or otherwise determine an estimated diode voltage across an individual diode 21-28 of the matrix conversion module 108 when that individual diode 21-28 conducts the inductor current ($i_L$). In this regard, the estimated diode voltage corresponds to the voltage across a conducting diode of the electrical system 100 when the switches 1-8 are operated to deliver energy to the DC interface 102. In accordance with one embodiment, the estimated diode voltage is determined by multiplying the nominal ON-resistance of the diodes 21-28 by the inductor current ($i_L$). In other embodiments, a function governing the voltage across a conducting diode as a function of the current flowing through (or being conducted by) the diode may be empirically determined and utilized to estimate the diode voltage for the measured inductor current ($i_L$). In practice, the nominal ON-resistance of the switches or a function to determine voltage across a conducting switch as a function of the conducted current may be obtained from data sheets provided by the manufacturer of the diodes. A gain block 240 multiplies the estimated diode voltage by four to obtain a total estimated diode voltage drop when delivering energy to the DC interface 102, because two diodes of diodes 21-28 of the matrix conversion module 108 and two diodes of diodes 29-32 of the first energy conversion module 104 conduct current when delivering energy to the DC interface 102 during a PWM cycle, as described above and in greater detail below. In this regard, assuming a transformer ratio of 1:1 for the isolation module 106, the current flowing through the diodes 29-32 of the first energy conversion module 104 is substantially equal to the current flowing through the diodes 21-28 (neglecting any capacitive and/or magnetic losses). Thus, the total estimated diode voltage drop accounts for the sum of the voltage across conducting diodes 21-28 of the matrix conversion module 108 and the voltage difference between the secondary windings 144 and the DC interface 102. In this manner, the total estimated diode voltage drop represents the portion of the voltage difference between node 132 and node 138 that is attributable to the diodes 21-28 of the matrix conversion module 108 and the isolation module 106 (or primary windings 146) when delivering energy to the DC interface 102.

In the illustrated embodiment, the voltage estimation block 232 includes a summation block 242 configured to add the total estimated switch voltage drop from the output of gain block 236 and the total estimated diode voltage drop from the output of gain block 240 to obtain an estimated total energy delivery voltage drop, that is, an estimated effective voltage difference between node 132 and node 138 when delivering energy to the DC interface 102. The summation block 242 is configured to subtract an estimated total cycling voltage drop from the estimated total energy delivery voltage drop to obtain an estimated voltage loss for the energy conversion modules 104, 108, that is, the estimated voltage across switches 1-8 and diodes 21-32 of the energy conversion modules 104, 108 during the current PWM cycle.

The estimated total cycling voltage drop represents an estimated effective voltage difference between node 132 and node 138 when operating the switches 1-8 of the matrix conversion module 108 to cycle energy through the inductor 110. In an exemplary embodiment, the voltage estimation block 232 includes a gain block 244 configured to multiply the measured inductor current ($i_L$) at input 214 by one half. In this regard, when the switches 1-8 of the matrix conversion module 108 are operated to cycle energy through the inductor 110 (e.g., by turning all of the switches 1-8 on concurrently), the inductor current is divided across the two sets of switches 1-8 configured to allow current in the appropriate direction from/to node 132 to/from node 138. A cycling voltage estimation block 246 configured to calculate or otherwise determine an estimated combined voltage across an individual switch 1-8 and an individual diode 21-28 of the matrix conversion module 108 when that combination of switch 1-8 and diode 21-28 conducts half of the inductor current while cycling energy through the inductor 110, in a similar manner as described above in the context of the switch voltage estimation block 234 and the cycling voltage estimation block 246. For example, an estimated switch voltage drop may be determined based on the nominal switch ON-resistance and half the inductor current and added to an estimated diode voltage drop determined based on the nominal diode ON-resistance and half the inductor current to obtain the estimated combined voltage drop. A gain block 248 is configured to multiply the estimated combined voltage drop by two to obtain a total estimated cycling voltage drop when cycling energy through the inductor 110. For example, when cycling energy through the inductor 110 in the direction indicated by arrow 190, approximately one half of the inductor current 190 is conducted from node 132 through switch 2 and diode 21 to node 134 and the other half of the inductor current 190 is conducted from node 132 to node 136 through switch 6 and diode 25. Similarly, one half of the inductor current 190 is conducted from node 134 through switch 8 and diode 27 to node 138 and the one half of the inductor current 190 is conducted from node 136 to node 138 through switch 4 and diode 23. Thus, the voltage difference between node 132 and node 138 is equal to the sum of the voltages across two switches 2, 8 and the voltages across two diodes 21, 27 (or alternatively, switches 4,6 and diodes 23, 25) which are each conducting one half of the inductor current ($i_L$). In this manner, the total estimated cycling voltage drop from the output of the gain block 248 represents the estimated effective voltage difference between node 132 and node 138 when cycling energy through the inductor 110 during a PWM cycle.

As set forth above, the total estimated cycling voltage drop from the output of the gain block 248 is provided to the third summation block 220 and subtracted from the AC input voltage reference (e.g., the sum of the measured AC input voltage ($V_{AC}$) at the AC interface 114 and the AC input voltage error value) to obtain the compensated AC input voltage reference value. In this regard, the total estimated cycling voltage drop is subtracted from the AC input voltage reference to account for the voltage difference between node 132 and node 138 when operating the matrix conversion module 108 to cycle energy.

In an exemplary embodiment, the total estimated cycling voltage drop from the output of the gain block 248 is also subtracted from the estimated total energy delivery voltage drop (e.g., the sum of the total estimated switch voltage drop from gain block 236 and the total estimated diode voltage drop from gain block 240) by summation block 242 to obtain a cumulative voltage across components of the energy conversion modules 104, 108 during the current PWM cycle. In this regard, the output of the summation block 242 represents the cumulative voltages across switches 1-8 and diodes 21-32 of the energy conversion modules 104, 108 during the current PWM cycle, that is, the cumulative voltage loss that is attributable to the components of the energy conversion modules 104, 108. The output of the summation block 242 is provided to an absolute value block 250 which determines the absolute value of the total estimated voltage drop to ensure the value provided to the fourth summation block 230 is not negative.

As described above, the total estimated voltage difference between nodes 132, 138 attributable to the components of the energy conversion modules 104, 108 is added to the measured DC output voltage ($V_{DC}$) to obtain a compensated DC output voltage reference value. In this manner, the adjusted DC output voltage value represents an estimated effective DC output voltage from the perspective of the inductor 110 (i.e., between nodes 132, 138) that accounts for the voltages across switches 1-8 and diodes 21-32 of the energy conversion modules 104, 108 during the current PWM cycle. The compensated AC input reference value from the output of the third summation block 220 is divided by the compensated DC output voltage reference value from the output of the fourth summation block 230 by division block 224 to obtain the compensated PWM duty cycle control value ($U_C$), as set forth above. In this manner, the compensated PWM duty cycle control value ($U_C$) accounts for voltage drops across the switches 1-8 and diodes 21-32 of the energy conversion modules 104, 108 during the current PWM cycle.

Figure 3:
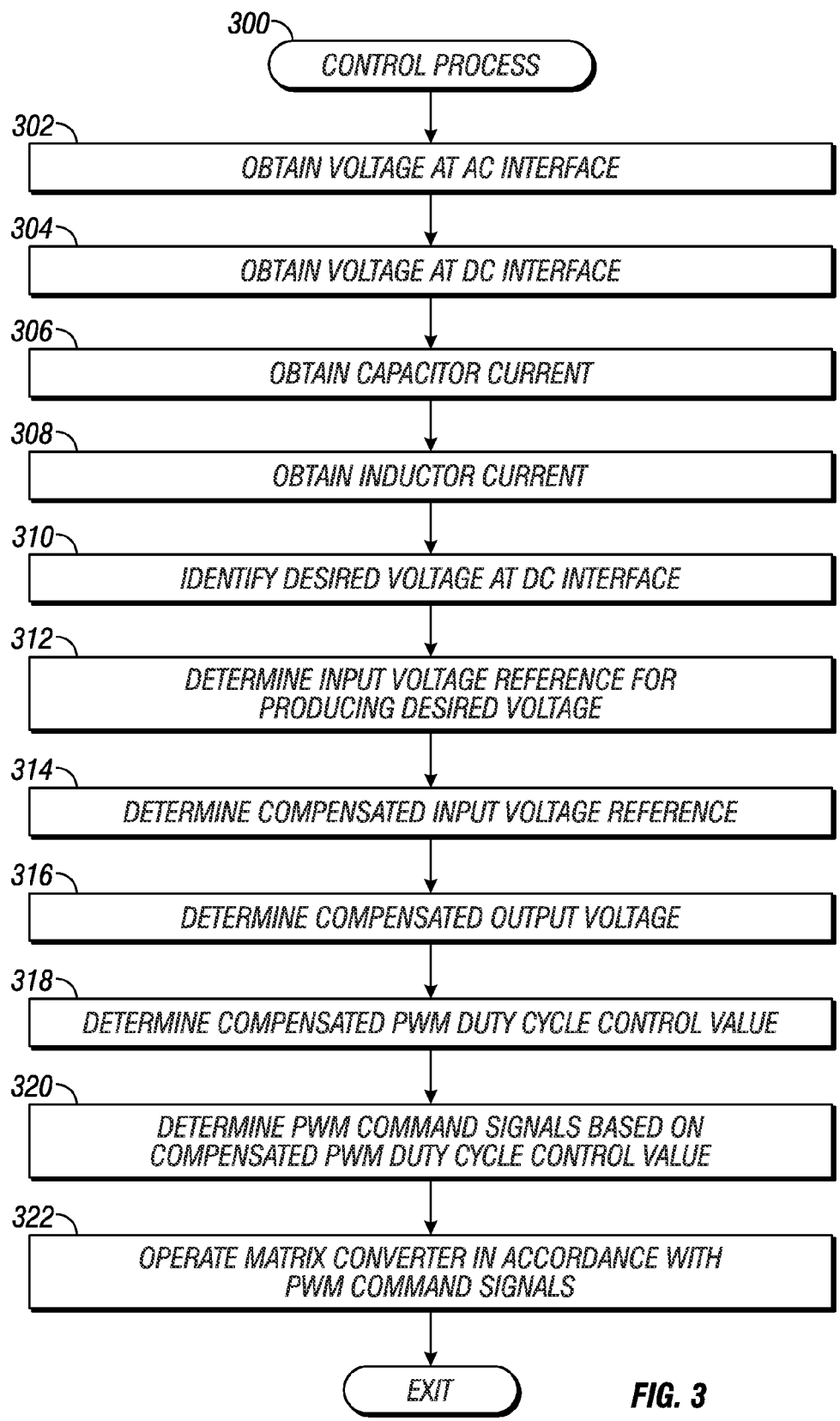
FIG. 3 is a flow diagram of control process suitable for use with the electrical system of FIG. 1 in accordance with one embodiment.

Referring now to FIG. 3, in an exemplary embodiment, an electrical system may be configured to perform a control process 300 and additional tasks, functions, and operations described below. The various tasks may be performed by software, hardware, firmware, or any combination thereof. For illustrative purposes, the following description may refer to elements mentioned above in connection with FIGS. 1-2. In practice, the tasks, functions, and operations may be performed by different elements of the described system, such as the control module 116, the control system 200, and/or the matrix conversion module 108. It should be appreciated that any number of additional or alternative tasks may be included, and may be incorporated into a more comprehensive procedure or process having additional functionality not described in detail herein.

Referring to FIG. 3, and with continued reference to FIGS. 1-2, in an exemplary embodiment, the control process 300 is performed in response to an interrupt request that is generated or otherwise received by the control module 116 at fixed regular intervals. For example, in accordance with one embodiment, the control module 116 receives an interrupt signal every twenty microseconds that causes the control module 116 to execute the control process 300. The control process 300 initializes or begins by obtaining measured values for the input voltage at the input interface, the output voltage at the output interface, the current through the capacitor, and the current through the inductor (tasks 302, 304, 306, 308). In this regard, the control module 116 and/or control system 200 obtains instantaneous values for the input voltage 180 at the AC interface 114, the output voltage 160 at the DC interface 102, the current 185 through capacitor 112, and the current 190 through inductor 110 by sampling, sensing, or otherwise measuring the respective values during a current PWM cycle (or switching interval), resulting in a measured AC input voltage ($V_{AC}$), a measured DC output voltage ($V_{DC}$), a measured capacitor current ($i_{CAP}$), and a measured inductor current ($i_L$).

In an exemplary embodiment, the control process 300 continues by identifying or otherwise determining a desired output voltage for the charging system at the output interface (task 310). For example, in accordance with one embodiment, the control module 116 may identify a desired value ($V_{REF}$) for the DC output voltage 160 at the DC interface 102 in response to receiving a command signal indicative of the desired DC output voltage ($V_{REF}$) from a controller associated with the DC energy source 118 (e.g., a battery controller). In another embodiment, the control module 116 may be preconfigured or otherwise assume that the desired DC output voltage 160 will always be equal to a constant value (e.g., an anticipated or expected voltage for the DC energy source 118).

After identifying the desired voltage at the DC interface, the control process 300 continues by determining an input voltage reference for the input voltage at the input interface to produce the desired output voltage at the output interface (task 312). As described above, in an exemplary embodiment, the control module 116 and/or control system 200 determines an output energy error value based on a difference between a square of the desired DC output voltage ($V_{REF}^2$) and a square of the measured DC output voltage ($V_{DC}^2$), and generates a desired input power reference value for producing the desired voltage ($V_{REF}$) at the DC interface 102 based on the output energy error value. The control module 116 and/or control system 200 converts the desired input power reference value to an AC input current reference value, subtracts the measured capacitor current ($i_{CAP}$) from the AC input current reference value to obtain an inductor current reference value, and subtracts the inductor current reference value from the measured inductor current ($i_L$) to obtain an inductor current error value. The control module 116 and/or control system 200 multiplies the inductor current error value by a gain factor to translate or otherwise convert the inductor current error value to an AC input voltage error value that is added to the measured AC input voltage ($V_{AC}$) to obtain an AC input voltage reference value. It will be appreciated in the art that the gain factor may be selected or otherwise chosen to provide a desired bandwidth for the control system 200.

In an exemplary embodiment, the control process 300 continues by determining a compensated input voltage reference for producing the desired output voltage at the output interface that accounts for voltages across components of the energy conversion modules (task 314). As described above, in an exemplary embodiment, the control module 116 and/or control system 200 determines a compensated AC input voltage reference by determining an estimated cycling voltage across the switches 1-8 and diodes 21-28 of the matrix conversion module 108 and subtracts the estimated cycling voltage from the AC input voltage reference value to obtain a compensated AC input voltage reference value at the output of the third summation block 220. In this regard, the estimated cycling voltage represents the estimated voltage differential between the input nodes 132, 138 of the matrix conversion module 108 while operating the switches S1-S8 of the matrix conversion module 108 to cycle energy through the inductor 110. As described above, in one embodiment, the control module 116 and/or control system 200 determines the estimated cycling voltage by estimating the voltage across one switch of the matrix conversion module 108 and one diode of the matrix conversion module 108 based on one half of the measured inductor current (e.g., $$\frac{i_L}{2}),$$

adding the estimated voltages across the switch and diode, and multiplying the result by two, because two switches and two diodes conduct one half of the inductor current from/to node 132 to/from node 138 when cycling energy through the inductor 110.

In an exemplary embodiment, the control process 300 continues by determining a compensated output voltage reference that accounts for voltages across components of the energy conversion modules (task 316). As described above, in an exemplary embodiment, the control module 116 and/or control system 200 determines the compensated DC output voltage reference by adding an estimated cumulative voltage loss for the energy conversion modules 104, 108 during the current PWM cycle to the measured instantaneous output voltage ($V_{DC}$) to obtain a compensated DC output voltage reference value at the output of the fourth summation block 230. In an exemplary embodiment, the control module 116 and/or control system 200 determines the estimated cumulative voltage loss for the energy conversion modules 104, 108 by determining a total estimated energy delivery voltage across components of the energy conversion modules 104, 108 and subtracting the total estimated cycling voltage across components of the matrix conversion module 108 from the total estimated energy delivery voltage to obtain the estimated cumulative voltage loss at the output of the summation block 242. In this manner, the compensated DC output voltage value represents an estimated effective DC voltage at the input of the matrix conversion module 108, that is, the effective DC voltage between nodes 132, 138 at the output of the inductor 110, during a PWM cycle for the measured inductor current ($i_L$).

As described above, in accordance with one embodiment, the estimated energy delivery voltage corresponds to the sum of estimated voltages across switches of the matrix conversion module 108 when operating the switches 1-8 to deliver energy to the DC interface 102 and estimated voltages across diodes of the energy conversion modules 104, 108 when delivering energy to the DC interface. The control module 116 and/or control system 200 calculates or otherwise determines the total estimated switch voltage drop when delivering energy to the DC interface 102 by estimating the voltage drop (or voltage loss) across a conducting switch of the matrix conversion module 108 and multiplying the estimated switch voltage drop by two, as described above. In a similar manner, the control module 116 and/or control system 200 calculates or otherwise determines the total estimated diode voltage drop when delivering energy to the DC interface 102 by estimating the voltage drop (or voltage loss) across a conducting diode of the matrix conversion module 108 and multiplying the estimated diode voltage drop by four. Thus, the total estimated energy delivery voltage represents the difference between the voltage difference between input nodes 132, 138 and the output voltage at the DC interface 102, or in other words, the portion of the effective output voltage as viewed from the inductor 110 at input nodes 132, 138 that is attributable to voltage drops (or voltage losses) across the switches and diodes of the energy conversion modules 104, 108 when delivering energy to the DC interface 102.

Referring again to FIG. 3, and with continued reference to FIGS. 1-2, the control process 300 continues by determining a compensated PWM duty cycle control value based on the ratio of the compensated input voltage reference to the compensated output voltage reference (task 318). As described above, in an exemplary embodiment, the control module 116 and/or control system 200 divides the compensated AC input voltage reference value from the output of the third summation block 220 by the compensated DC output voltage reference value at the output of the fourth summation block 230 to obtain the compensated PWM duty cycle control value ($U_C$) at output 228. In this manner, the compensated PWM duty cycle control value ($U_C$) accounts for voltages across the switches 1-8 and diodes 21-32 of the energy conversion modules 104, 108 during a PWM cycle.

In an exemplary embodiment, the control process 300 continues by determining PWM command signals for operating the switches of the matrix conversion module based on the compensated PWM duty cycle control value for the matrix conversion module, and operating the switches of the matrix conversion module in accordance with the PWM command signals (tasks 320, 322). In this regard, the control module 116 determines PWM command signals for operating switches 1-8 during the next PWM cycle such that the matrix conversion module 108 delivers energy from the AC interface 114 to the DC interface 102 during the next PWM cycle at a duty cycle (d) equal to one minus the compensated PWM duty cycle control value ($d=1-U_C$). During the next PWM cycle, the control module 116 operates the switches 1-8 of the matrix conversion module 108 in accordance with the PWM command signals to deliver energy from the AC interface 114 to the DC interface 102 for a percentage of the PWM cycle corresponding to the duty cycle (d). In this regard, the control module 116 operates the switches 1-8 of the matrix conversion module 108 to cycle or otherwise circulate the inductor current through the matrix conversion module 108 without delivering energy to the DC interface 102 for a percentage of the PWM cycle corresponding to the compensated PWM duty cycle control value ($U_C$).

For example, referring again to FIG. 1, when the voltage at the AC interface 114 is positive, the control module 116 concurrently closes (or turns on) switches 2, 4, 6 and 8 to cycle or otherwise circulate the inductor current ($i_L$) through the matrix conversion module 108 for a first time period ($t_1$) corresponding to a first portion of the PWM cycle. Switches 2 and 6 and diodes 21 and 25 each conduct at least a portion of the inductor current ($i_L$) at node 132, and switches 8 and 4 and diodes 27 and 23 each conduct the portion of the inductor current flowing through switches 2 and 6 and diodes 21 and 25, respectively, to node 138. The control module 116 subsequently opens (or turns off) switches 6 and 8 while maintaining switches 2 and 4 in a closed state to conduct the inductor current ($i_L$) from node 132 to node 138 through the primary windings 146 and apply a voltage across the primary windings 146, thereby delivering energy to the DC interface 102 (via secondary windings 144 and the energy conversion module 104) for a second time period ($t_2$) corresponding to a second portion of the PWM cycle. The control module 116 then concurrently closes (or turns on) switches 2, 4, 6 and 8 to cycle or otherwise circulate the inductor current ($i_L$) through the matrix conversion module 108 for a third time period ($t_3$) corresponding to a third portion of the PWM cycle. The control module 116 subsequently opens (or turns off) switches 2 and 4 while maintaining switches 6 and 8 in a closed state to conduct the inductor current ($i_L$) from node 132 to node 138 through the primary windings 146 and apply a voltage across the primary windings 146 and thereby deliver energy to the DC interface 102 (via secondary windings 144 and the energy conversion module 104) for a fourth time period ($t_4$) corresponding to the remaining portion of the PWM cycle. The sum of the four time periods correspond to the duration of the PWM cycle, wherein the sum of the first time period and the third time period divided by the sum of the four time periods corresponds to the compensated PWM duty cycle control value (e.g., $$U_C = \frac{t_1 + t_3}{t_1 + t_2 + t_3 + t_4})$$

and the sum of the second time period and the fourth time period divided by the sum of the four time periods corresponds to the duty cycle (e.g., $$d = \frac{t_2 + t_4}{t_1 + t_2 + t_3 + t_4}).$$

Conversely, when the voltage at the AC interface 114 is negative, the control module 116 concurrently closes (or turns on) switches 1, 3, 5 and 7 to cycle or otherwise circulate the inductor current ($i_L$) through the matrix conversion module 108 for a first time period ($t_1$). The control module 116 subsequently opens (or turns off) switches 5 and 7 while maintaining switches 1 and 3 in a closed state to conduct the inductor current ($i_L$) from node 138 to node 132 through the primary windings 146 and apply a voltage across the primary windings 146, and thereby delivers energy to the DC interface 102 (via secondary windings 144 and the energy conversion module 104) for a second time period ($t_2$). The control module 116 then concurrently closes (or turns on) switches 1, 3, 5 and 7 to cycle or otherwise circulate the inductor current ($i_L$) through the matrix conversion module 108 for a third time period ($t_3$), and subsequently opens (or turns off) switches 1 and 3 while maintaining switches 5 and 7 in a closed state to conduct the inductor current ($i_L$) from node 138 to node 132 through the primary windings 146 and apply a voltage across the primary windings 146, and thereby delivers energy to the DC interface 102 (via secondary windings 144 and the energy conversion module 104) for a fourth time period ($t_4$). As set forth above, the sum of the four time periods correspond to the duration of the PWM cycle, wherein the ratio of the sum of the first time period and the third time period to the duration of the PWM cycle corresponds to the compensated PWM duty cycle control value, and the ratio of the sum of the second time period and the fourth time period to the duration of the PWM cycle corresponds to the duty cycle (d).

Referring again to FIG. 3, the control process 300 may repeat throughout operation of the electrical system 100 to produce a desired DC output voltage at the DC interface 102. In this regard, while operating the matrix conversion module 108 to deliver energy to the DC interface 102 in accordance with the duty cycle (d) during one PWM cycle, the control module 116 and/or control system 200 repeats the control process 300 to determine a compensated PWM duty cycle control value for the next PWM cycle, and so on.

To briefly summarize, one advantage of the systems and/or methods described above is that a feedforward control system may be utilized to operate a matrix conversion module to achieve a desired DC output voltage while at the same time achieving substantially unity power factor and low total harmonic distortion at the AC input. As noted above, the estimated cumulative voltage loss across switches and diodes of the energy conversion modules is added to the measured DC output voltage, which, in turn, increases the duty cycle (or decreases the duty cycle control value) for operating the matrix conversion module in a manner that accounts for the losses caused by the switches and diodes. As a result, the accuracy and dynamic performance of the feedforward control system is improved.

For the sake of brevity, conventional techniques related to electrical energy and/or power conversion, electrical charging systems, power converters, pulse-width modulation (PWM), and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The foregoing description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements or direct electrical connections between circuit elements, additional intervening elements, devices, features, or components may be present in an embodiment of the depicted subject matter. In addition, certain terminology may also be used herein for the purpose of reference only, and thus is not intended to be limiting. The terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electrical system comprising:
   an input interface;
   an output interface;
   a first energy conversion module coupled between the input interface and the output interface, the first energy conversion module including one or more switching elements;
   an inductive element coupled electrically in series between the input interface and the first energy conversion module; and
   a control module coupled to the first energy conversion module and the inductive element, wherein the control module is configured to:
   determine an estimated voltage loss for the first energy conversion module based on a current through the inductive element; obtain a measured output voltage at the output interface; add the estimated voltage loss to the measured output voltage to obtain a compensated output voltage;
   determine a compensated duty cycle control value for operating the first energy conversion module to produce a desired voltage at the output based at least in part on the compensated output voltage, wherein the compensated duty cycle control value is influenced by a current through the inductive element and accounts for voltage across the one or more switching elements while operating the first energy conversion module; and operate the one or more switching elements of the first energy conversion module to deliver energy to the output interface with a duty cycle that is influenced by the compensated duty cycle control value.

2. The electrical system of claim 1, wherein the control module is coupled to the input interface and the output interface and configured to:

obtain a measured output voltage at the output interface;

determine an input voltage reference for operating the first energy conversion module to produce the desired voltage at the output interface based on the measured output voltage; and determine the compensated duty cycle control value based at least in part on the input voltage reference and the compensated output voltage.

3. The electrical system of claim 2, wherein the control module is configured to adjust the input voltage reference based at least in part on the current through the inductive element before determining the compensated duty cycle control value.

4. The electrical system of claim 3, wherein:

the control module adjusts the input voltage reference based at least in part on the current through the inductive element to obtain a compensated input voltage reference; and the control module is configured to divide the compensated input voltage reference by the compensated output voltage to obtain the compensated duty cycle control value.

5. The electrical system of claim 1, further comprising:

a second energy conversion module coupled to the output interface; and an isolation module coupled between the first energy conversion module and the second energy conversion module, the isolation module providing galvanic isolation between the first energy conversion module and the second energy conversion module.

6. The electrical system of claim 5, wherein the control module is coupled to the input interface and the output interface and configured to:

determine an input voltage reference for operating the first energy conversion module to produce the desired voltage at the output interface based on the measured output voltage; and determine the compensated duty cycle control value based at least in part on the input voltage reference and the compensated output voltage.

7. The electrical system of claim 6, wherein the control module is configured to:

determine an estimated cycling voltage for the first energy conversion module based on the current through the inductive element, the estimated cycling voltage being attributable to operating the one or more switching elements of the first energy conversion module to cycle energy through the inductive element;

subtract the estimated cycling voltage from the input voltage reference to obtain a compensated input voltage reference; and divide the compensated input voltage reference by the compensated output voltage to obtain the compensated duty cycle control value.

8. The electrical system of claim 7, wherein the control module is configured to determine the estimated voltage loss by:

determining an estimated energy delivery voltage for the first energy conversion module based on the current through the inductive element, the estimated energy delivery voltage being attributable to operating the one or more switching elements of the first energy conversion module to deliver energy to the output interface; and subtract the estimated cycling voltage from the estimated energy delivery voltage to obtain the estimated voltage loss.

9. The electrical system of claim 5, wherein the first energy conversion module comprises a matrix conversion module including:

a first node;
a second node;
a third node;
a fourth node;
a first switching element coupled between the first node and the third node, the first switching element being configured to allow current from the third node to the first node when the first switching element is closed;
a second switching element coupled between the first switching element and the third node, the second switching element being configured to allow current from the first node to the third node when the second switching element is closed;
a third switching element coupled between the first node and the fourth node, the third switching element being configured to allow current from the fourth node to the first node when the third switching element is closed;
a fourth switching element coupled between the third switching element and the fourth node, the fourth switching element being configured to allow current from the first node to the fourth node when the fourth switching element is closed;
a fifth switching element coupled between the second node and the fourth node, the fifth switching element being configured to allow current from the second node to the fourth node when the fifth switching element is closed;
a sixth switching element coupled between the fifth switching element and the second node, the sixth switching element being configured to allow current from the fourth node to the second node when the sixth switching element is closed;
a seventh switching element coupled between the second node and the third node, the seventh switching element being configured to allow current from the second node to the third node when the seventh switching element is closed; and
an eighth switching element coupled between the seventh switching element and the second node, the eighth switching element being configured to allow current from the third node to the second node when the eighth switching element is closed.

10. The electrical system of claim 9, wherein:

the inductive element is coupled electrically in series between the first node of the matrix conversion module and a first input node of the input interface;

the second node of the matrix conversion module is coupled to a second input node of the input interface;

the isolation module comprises a first set of windings coupled between the third node and the fourth node and a second set of windings coupled to the second energy conversion module, the second set of windings being magnetically coupled to the first set of windings; and the control module is configured to operate the first switching element, the second switching element, the third switching element, the fourth switching element, the fifth switching element, the sixth switching element, the seventh switching element, and the eighth switching element to deliver energy to the output interface with the duty cycle corresponding to the compensated duty cycle control value.

11. A method for delivering energy from an input interface to an output interface using an energy conversion module coupled between the input interface and the output interface, the energy conversion module including a plurality of switching elements coupled to an inductive element, the method comprising:
    obtaining a measured voltage at the output interface;
    obtaining a current through the inductive element;
    determining an estimated voltage loss for the energy conversion module based on the current through the inductive element;
    adding the measured voltage and the estimated voltage loss to obtain a compensated output voltage;
    determining an input voltage reference for producing a desired output voltage at the output interface;
    determining a compensated duty cycle control value based at least in part on the input voltage reference and the compensated output voltage; and
    operating the plurality of switching elements to deliver energy from the input interface to the output interface with a duty cycle that is influenced by the compensated duty cycle control value.

12. The method of claim 11, further comprising:
    determining an estimated cycling voltage for the energy conversion module based on the current through the inductive element, the estimated cycling voltage being based at least in part on estimated voltage across the plurality of switching elements when operating the plurality of switching elements to cycle energy through the inductive element; and
    subtracting the estimated cycling voltage from the input voltage reference to obtain a compensated input voltage reference, wherein determining the compensated duty cycle control value comprises dividing the compensated input voltage reference by the compensated output voltage.

13. The method of claim 12, wherein the energy conversion module includes a plurality of diodes, each diode being configured antiparallel to a respective switching element of the plurality of switching elements, and wherein determining the estimated cycling voltage comprises:
    determining an estimated switch voltage across a subset of the plurality of switching elements when operating the plurality of switching elements to cycle energy through the inductive element;
    determining an estimated diode voltage across a subset of the plurality of diodes when operating the plurality of switching elements to cycle energy through the inductive element; and
    adding the estimated switch voltage and the estimated diode voltage to obtain the estimated cycling voltage.

14. The method of claim 12, wherein determining the estimated voltage loss comprises:
    determining an estimated energy delivery voltage for the energy conversion module based on the current through the inductive element, the estimated energy delivery voltage being based at least in part on estimated voltage across the plurality of switching elements when operating the plurality of switching elements to deliver energy to the output interface; and
    subtracting the estimated cycling voltage from the estimated energy delivery voltage to obtain the estimated voltage loss.

15. The method of claim 14, wherein the energy conversion module includes a plurality of diodes, each diode being configured antiparallel to a respective switching element of the plurality of switching elements, and wherein:
    determining the estimated cycling voltage comprises:
        determining a first estimated switch voltage across conducting switching elements when operating the plurality of switching elements to cycle energy through the inductive element;
        determining a first estimated diode voltage across conducting diodes when operating the plurality of switching elements to cycle energy through the inductive element; and
        adding the first estimated switch voltage and the first estimated diode voltage to obtain the estimated cycling voltage; and
    determining the estimated energy delivery voltage comprises:
        determining a second estimated switch voltage across conducting switching elements of the plurality of switching elements when operating the plurality of switching elements to deliver energy to the output interface;
        determining a second estimated diode voltage across conducting diodes of the plurality of diodes when operating the plurality of switching elements to deliver energy to the output interface; and
        adding the second estimated switch voltage and the second estimated diode voltage to obtain the estimated energy delivery voltage.

16. The method of claim 11, wherein the duty cycle corresponds to one minus the compensated duty cycle control value, wherein operating the plurality of switching elements to deliver energy from the input interface to the output interface with the duty cycle comprises:
    determining pulse-width modulation (PWM) command signals for operating the plurality of switching elements to deliver energy from an AC energy source coupled to the input interface to a DC energy source coupled to the output interface for a percentage of a switching interval, the percentage being equal to the duty cycle; and
    operating the plurality of switching elements in accordance with the PWM command signals.

17. The method of claim 11, wherein determining the input voltage reference comprises:
    determining an input power reference for the input interface based on the desired output voltage at the output interface and the measured voltage at the output interface;
    determining an input current reference based on the input power reference;
    determining an inductor current reference based on a difference between the input current reference and a measured current through a capacitive element coupled electrically parallel to the input interface;
    subtracting the inductor current reference from the current through the inductive element to obtain an inductor current error;
    converting the inductor current error to an input voltage error; and
    adding the input voltage error and a measured voltage at the input interface to obtain the input voltage reference.

18. An electrical system comprising:
    a direct current (DC) interface;

an alternating current (AC) interface;
an isolation module including a first set of windings magnetically coupled to a second set of windings;
a first energy conversion module coupled between the DC interface and the first set of windings;
a second energy conversion module coupled to the second set of windings, the second energy conversion module including a plurality of switches;
an inductive element coupled between the second energy conversion module and the AC interface; and
a control module coupled to the DC interface, the AC interface, the inductive element, and the second energy conversion module, wherein the control module is configured to:
  determine an input voltage reference for producing a desired voltage at the DC interface based on a measured voltage at the DC interface, a measured current through the inductive element, and a measured voltage at the AC interface;
  determine an estimated cumulative voltage loss for the second energy conversion module based on the measured current through the inductive element;
  add the measured voltage at the DC interface and the estimated cumulative voltage loss to obtain a compensated output voltage;
  determine a compensated pulse-width modulation (PWM) duty cycle control value for operating the first energy conversion module based on the input voltage reference and the compensated output voltage; and
  operate the plurality of switches of the second energy conversion module in accordance with the compensated PWM duty cycle control value.

19. The electrical system of claim 18, wherein the control module is configured to:
  determine an estimated cycling voltage for the second energy conversion module based on the measured current through the inductive element;
  subtract the estimated cycling voltage from the input voltage reference to obtain a compensated input voltage reference; and
  determine the compensated PWM duty cycle control by dividing the compensated input voltage reference by the compensated output voltage.

* * * * *